United States Patent [19]
Johnson et al.

[11] Patent Number: 5,485,859
[45] Date of Patent: Jan. 23, 1996

[54] DISHWASHING AID FOR THE HANDICAPPED

[76] Inventors: Charles D. Johnson, 701 E. Tantallon Dr., Fort Washington, Md. 20744; Debra Johnson, 909 Watson St. #1B, Baltimore, Md. 21202

[21] Appl. No.: 314,809

[22] Filed: Sep. 29, 1994

[51] Int. Cl.⁶ ................................................. B08B 13/00
[52] U.S. Cl. ..................... 134/115 R; 134/201; 134/135; 211/41
[58] Field of Search ................................. 134/115, 201, 134/135; 220/574, 487; 4/656, 628, 629; 211/41, 181, 180

[56] References Cited

U.S. PATENT DOCUMENTS

| | | | |
|---|---|---|---|
| 928,762 | 7/1909 | Insinger | 211/41 |
| 1,205,769 | 11/1916 | McGill | 220/487 |
| 1,810,855 | 6/1931 | Rockmore | 220/487 |
| 2,669,240 | 2/1954 | Thorson | 220/487 X |
| 3,742,965 | 7/1973 | Hudziak | 134/115 R |
| 4,033,461 | 7/1977 | Nevai | 4/656 |
| 4,531,246 | 7/1985 | Earley | 4/629 |
| 4,884,714 | 12/1989 | Bechtel | 211/41 |

FOREIGN PATENT DOCUMENTS

| | | | |
|---|---|---|---|
| 407394 | 3/1934 | United Kingdom | 134/201 |
| 558388 | 1/1944 | United Kingdom | 4/629 |

*Primary Examiner*—Frankie L. Stinson

[57] ABSTRACT

A new and improved dishwashing aid for the handicapped comprised of a container having four walls, a closed bottom, an open top, an inner surface, and an outer surface. A plurality of apertures are formed in the four walls. The device contains a plurality of holding chambers. Each holding chamber having a closed bottom, an open top, and a curved sidewall therebetween. The curved sidewall is tapered from the open top to the closed bottom. The curved sidewall has a first end and a second end. The first end is integral with the inner surface of one of the four walls. The second end is integral with the inner surface of another of the four side walls adjacent. The device contains a plurality of suction cups. Each of the suction cups has an extension. Each extension is coupled to the outer surface of the rectangular container through the plurality of apertures that are formed therein by a fastening means.

2 Claims, 4 Drawing Sheets

5,485,859

DISHWASHING AID FOR THE HANDICAPPED

BACKGROUND OF THE INVENTION

1. Field of the Invention

The present invention relates to a dishwashing aid for the handicapped and more particularly pertains to allowing a handicapped or physically unable person to wash dishes without frustration with a dishwashing aid for the handicapped.

2. Description of the Prior Art

The use of dishwashing devices is known in the prior art. More specifically, dishwashing devices heretofore devised and utilized for the purpose of helping to wash dishes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,957,254 to Hill discloses a universal container holder.

U.S. Pat. No. 4,932,701 to Cornillier discloses a handling assembly incorporating suction cups.

U.S. Pat. No. 4,698,861 to Bogusz discloses a dish washing aid device.

U.S. Pat. No. 3,742,965 to Hudziak discloses a rinsing device.

U.S. Pat. No. 3,433,363 to Clearman discloses a dish holding rack.

While these devices fulfill their respective, particular objective and requirements, the aforementioned patents do not describe a dishwashing aid for the handicapped that allow a handicapped or physically unable person to wash dishes without frustration.

In this respect, the dishwashing aid for the handicapped according to the present invention substantially departs from the conventional concepts and designs of the prior art, and in doing so provides an apparatus primarily developed for the purpose of allowing a handicapped or physically unable person to wash dishes without frustration.

Therefore, it can be appreciated that there exists a continuing need for a new and improved dishwashing aid for the handicapped which can be used for allowing a handicapped or physically unable person to wash dishes without frustration. In this regard, the present invention substantially fulfills this need.

SUMMARY OF THE INVENTION

In the view of the foregoing disadvantages inherent in the known types of dishwashing devices now present in the prior art, the present invention provides an improved dishwashing aid for the handicapped. As such, the general purpose of the present invention, which will be described subsequently in greater detail, is to provide a new and improved dishwashing aid for the handicapped and method which has all the advantages of the prior art and none of the disadvantages.

To attain this, the present invention essentially comprises a rectangular plastic mesh container having four side walls, a closed bottom, an open top, an inner surface, and an outer surface. A plurality of apertures are formed in the four side walls with at least one aperture formed in each of the four side walls. The rectangular plastic mesh container functions to fit inside of a sink. The device contains a plurality of holding-chambers. Each holding container has a closed bottom, an open top, and a curved sidewall therebetween. The curved sidewall is tapered from the open top to the closed bottom. The curved sidewall has a first end and a second end. The first end is integral with the inner surface of one of the four side walls. The second end is integral with the inner surface of another of the four side walls adjacent. The holding chambers function to hold dishes and pans loosely in place for the user. The device also contains a plurality of suction cups. Each of the suction cups has an extension. Each extension is coupled to the outer surface of the rectangular plastic mesh container through one of the plurality of apertures that are formed therein by a fastening Means. Each of the suction cups function to secure the rectangular container inside of a sink.

There has thus been outlined, rather broadly, the more important features of the invention in order that the detailed description thereof that follow may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dishwashing aid for the handicapped which has all the advantages of the prior art dishwashing devices and none of the disadvantages.

It is another object of the present invention to provide a new and improved dishwashing aid for the handicapped which may be easily and efficiently manufactured and marketed.

It is a further object of the present invention to provide a new and improved dishwashing aid for the handicapped which is of durable and reliable construction.

An even further object of the present invention is to provide a new and improved dishwashing aid for the handicapped which is susceptible of a low cost of manufacture with regard to both materials and labor, and which accordingly is then susceptible of low prices of sale to the consuming public, thereby making such a dishwashing aid for the handicapped economically available to the buying public.

Still yet another object of the present invention is to provide a new and improved dishwashing aid for the handicapped which provides in the apparatuses and methods of the prior art some of the advantages thereof, while simultaneously overcoming some of the disadvantages normally associated therewith.

Even still another object of the present invention is to provide a new and improved dishwashing aid for the handicapped for allowing a handicapped or physically unable person to wash dishes without frustration.

Lastly, it is an object of the present invention to provide a new and improved dishwashing aid for the handicapped a comprised of a container having four walls, a closed bottom, an open top, an inner surface, and an outer surface. A plurality of apertures are formed in the four walls. The device contains a plurality of holding chambers. Each holding chamber having a closed bottom, an open top, and a curved sidewall therebetween. The curved sidewall is tapered from the open top to the closed bottom. The curved sidewall has a first end and a second end. The first end is integral with the inner surface of one of the four walls. The second end is integral with the inner surface of another of the four side walls adjacent. The device contains a plurality of suction cups. Each of the suction cups has an extension. Each extension is coupled to the outer surface of the rectangular container through the plurality of apertures that are formed therein by a fastening means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
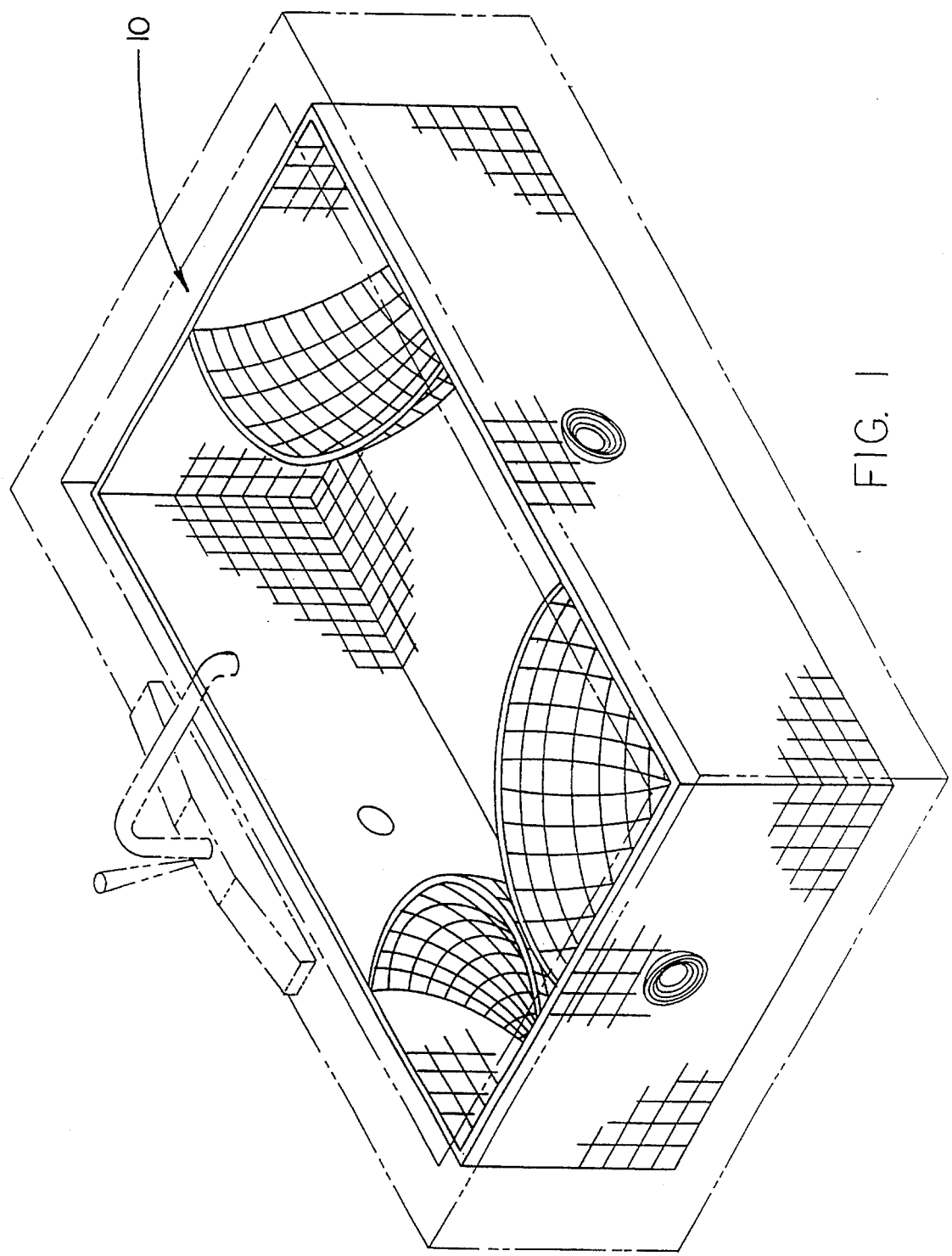
FIG. 1 is a perspective view of the preferred embodiment of the dishwashing aid for the handicapped constructed in accordance with the principles of the present invention.
Figure 2:
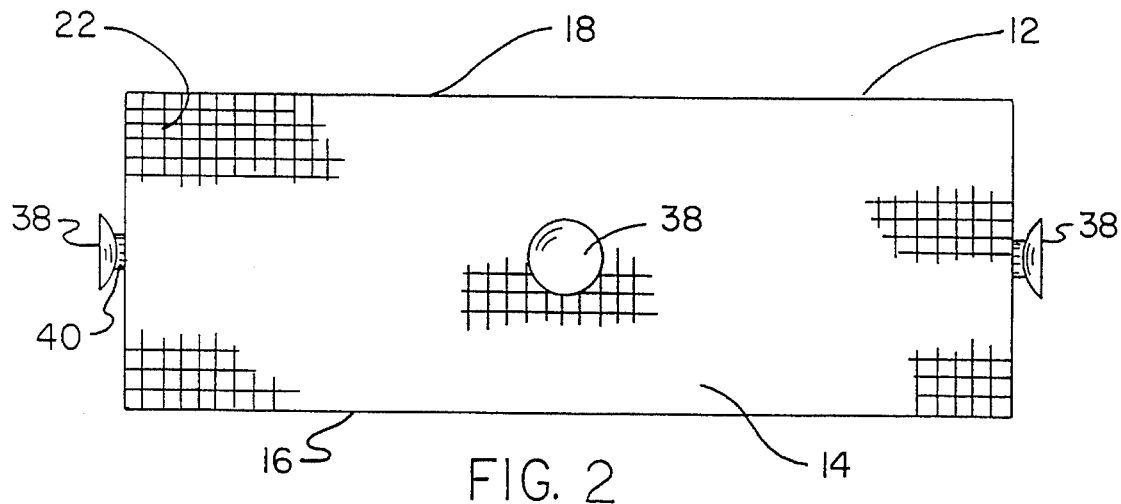
FIG. 2 is a front view of the present invention as shown in FIG. 1.
Figure 3:
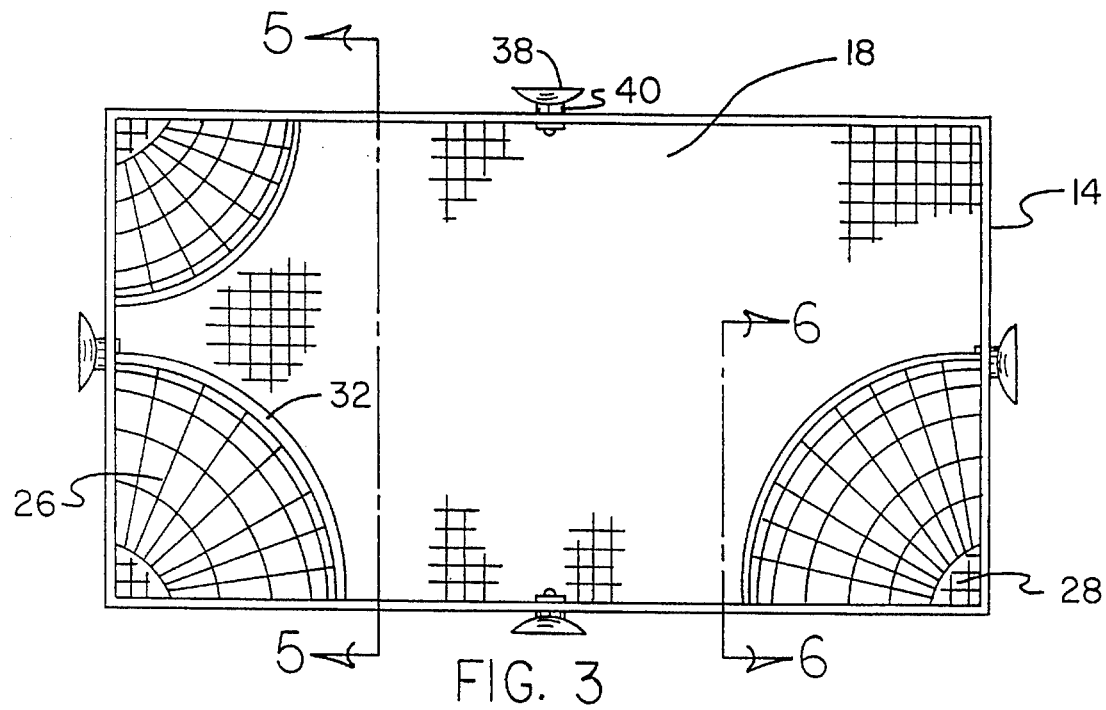
FIG. 3 is a plan view of the present invention as shown in FIG. 1.
Figure 4:
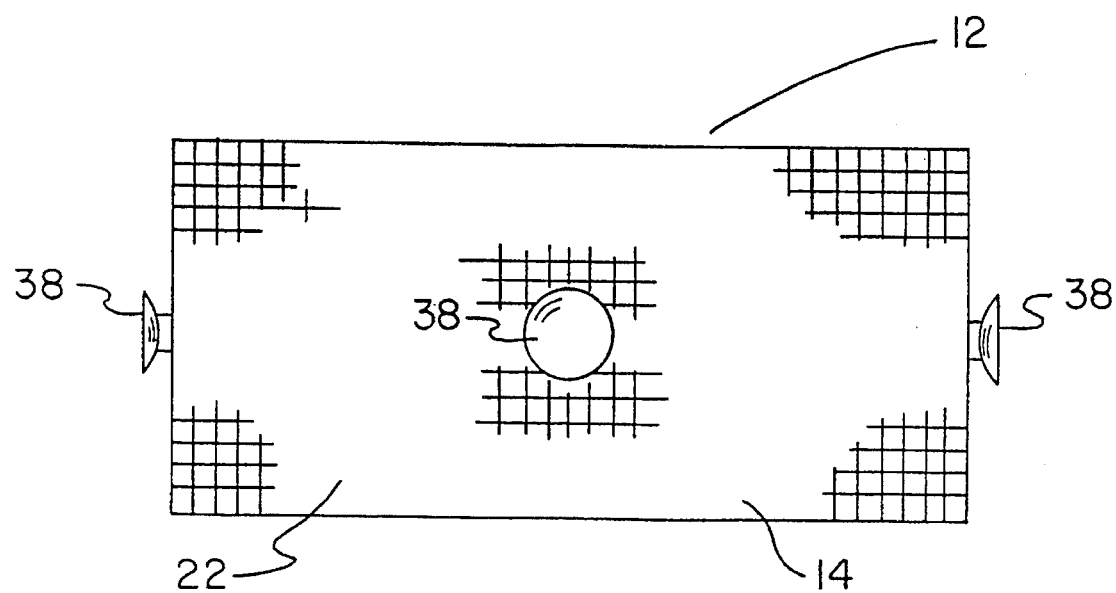
FIG. 4 is a side view of the present invention as shown in FIG. 1.
Figure 5:
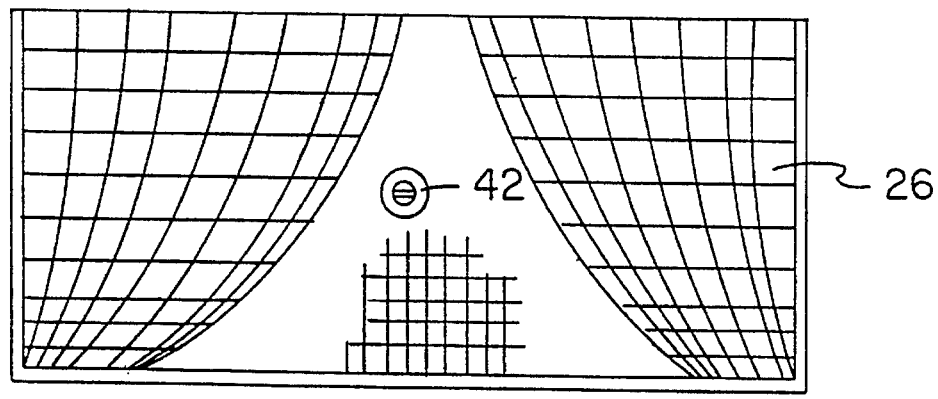
FIG. 5 is a cross-sectional view of the present invention as seen along line 5—5 of FIG. 3.
Figure 6:
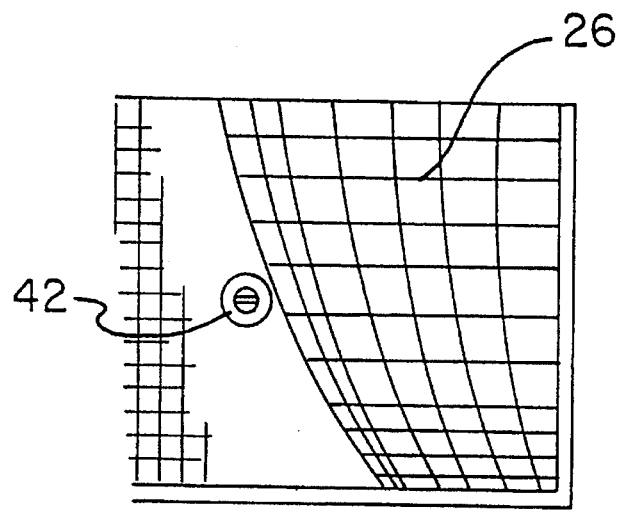
FIG. 6 is a sectional view of the present invention as seen along line 6—6 of FIG. 3.
Figure 7:
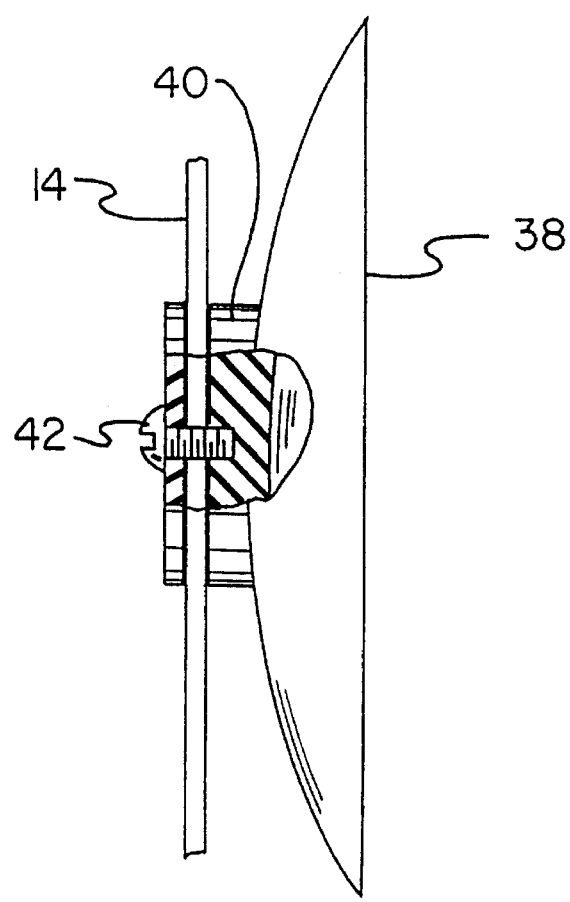
FIG. 7 is a partial side view of the suction cup of the present invention.

With reference now to the drawings, and in particular, to FIG. 1 thereof, the preferred embodiment of the new and improved dishwashing aid for the handicapped embodying the principles and concepts of the present invention and generally designated by the reference number 10 will be described.

Specifically, it will be noted in the various Figures that the device relates to a dishwashing aid for the handicapped allowing a handicapped or physically unable person to wash dishes without frustration. Ill its broadest context, the device consists of a rectangular plastic mesh container, a plurality of holding chambers, and a plurality of suction cups.

The device 10 contains a rectangular plastic mesh container 12 having four side walls 14, a closed bottom 16, an open top 18 an inner surface 20, and an outer surface 22 A plurality of apertures 24 are formed in the four side walls 14 with at least one aperture 24 formed in each of the four side walls 14. The rectangular plastic mesh container 12 functions to fit inside of a sink.

The device 10 contains a plurality of holding chambers 26. In the preferred embodiment, the number of holding chambers 26 is three. Each holding container 26 has a closed bottom 28, an open top 30, and a curved sidewall 32 therebetween. The curved sidewall 32 is tapered from the open top 30 to the closed bottom 28. The curved sidewall 32 has a first end 34 and a second end 36. The first end 34 is integral with the inner surface 20 of one of the four side walls 14. The second end 36 is integral with the inner surface 20 of another of the four side walls 14 adjacent. The holding chambers 26 function to hold dishes and pans loosely in place for the user.

The device 10 also contains a plurality of suction cups 38. In the preferred embodiment, the number of suction cups 38 is four. Each of the suction cups 38 has an extension 40. Each extension 40 is coupled to the outer surface 22 of the rectangular plastic mesh container 12 through one of the plurality of apertures 24 that are formed therein by a fastening means 42. Each of the suction cups 38 function to secure the rectangular plastic mesh container 12 inside of a sink.

The present invention is an insert that is placed in a sink. It will enable a handicapped person to do the dishes by using only one hand. The insert is intended for people who have lost a hand or an arm, or a portion thereof. People who have lost the use of one hand, because of a stroke or other problems, also need the assistance that this invention provides. When they attempt to wash the dishes using only one hand, they must trap the object against the wall of the sink, while trying to swab it clean with a dishcloth held and manipulated in the fingers. The results are terrible and serve to frustrate the handicapped individual, because the dishes slip out of the soapy hands and break, or must constantly be recaptured.

The present invention is made of plastic and fits closely into the sink, but is held securely in place by suction cups on each side that clamp it to the edges of the sink. The insert has separate depressions for cups, dishes, bowls, saucers, pots, and pans. Each has steeply tapered sides to accept every size of item that is placed in them. They are held somewhat loosely in place so they do not shift around or escape while they are being washed. Several sizes can be made to match different sink sizes.

The present invention reduces breakage of dishes and allows the dishwashing to be done in a reasonable amount of time, without exasperation and depressing frustration. Life is difficult enough for handicapped people without adding such simple chores as dishwashing to their problems.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated-in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved dishwashing aid for allowing a handicapped or physically unable person to wash dishes without frustration comprising, in combination:

a rectangular plastic mesh container having four side walls, a closed bottom, an open top, an inner surface, and an outer surface, a plurality of apertures formed in the four side walls with at least one aperture formed in each of the four side walls, the rectangular container functioning to fit inside of a sink;

a plurality of mesh holding chambers, each holding chamber having a closed bottom, an open top, and a curved sidewall therebetween, the curved sidewall being tapered from the open top to the closed bottom, the curved sidewall having a first end and a second end, the first end integral with the inner surface of one of the four side walls, the second end integral with the inner surface of one of the four side walls adjacent, the holding chambers functioning to hold dishes and pans loosely in place for the user;

a plurality of suction cups, each of the suction cups having an extension, each extension coupled to the outer surface of the rectangular plastic mesh container through one of the plurality of apertures formed therein by a fastening means, the suction cups functioning to secure the rectangular container inside of a sink.

2. A new and improved dishwashing aid for handicapped people comprising, in combination:

a mesh container having four walls, a closed bottom, an open top, an inner surface, and an outer surface, a plurality of apertures formed in the four walls;

a plurality of mesh holding chambers having a closed bottom, an open top, and a curved sidewall therebetween, the curved sidewall being tapered from the open top to the closed bottom, the curved sidewall having a first end and a second end, the first end integral with the inner surface of one of the four walls, the second end integral with the inner surface of one of the side adjacent, the holding chambers functioning to hold dishes and pans loosely in place for the user;

a plurality of suction cups having extensions, the extensions coupled to the outer surface of the rectangular container through plurality of apertures formed therein by a fastening means.

* * * * *